United States Patent [19]
Malhotra et al.

[11] Patent Number: 5,931,995
[45] Date of Patent: *Aug. 3, 1999

[54] INK COMPOSITIONS

[75] Inventors: Shadi L. Malhotra; Danielle C. Boils, both of Mississauga, Canada

[73] Assignee: Xerox Corporation, Stamford, Conn.

[*] Notice: This patent is subject to a terminal disclaimer.

[21] Appl. No.: 08/935,929

[22] Filed: Sep. 23, 1997

[51] Int. Cl.$^6$ .................................................. C09D 11/00
[52] U.S. Cl. ..................... 106/31.58; 106/31.29; 106/31.21
[58] Field of Search .............. 106/31.58, 31.29, 106/31.21

[56] References Cited

U.S. PATENT DOCUMENTS

| | | | |
|---|---|---|---|
| 4,490,731 | 12/1984 | Vaught | 346/140 R |
| 4,751,528 | 6/1988 | Spehrley, Jr. et al. | 346/140 R |
| 4,791,439 | 12/1988 | Guiles | 346/140 R |
| 4,840,674 | 6/1989 | Schwarz | 106/22 |
| 4,853,036 | 8/1989 | Koike et al. | 106/20 |
| 5,006,170 | 4/1991 | Schwarz et al. | 106/20 |
| 5,017,225 | 5/1991 | Nakanishi et al. | 106/31.21 |
| 5,041,161 | 8/1991 | Cooke et al. | 106/22 |
| 5,069,719 | 12/1991 | Ono | 106/31.58 |
| 5,098,477 | 3/1992 | Vieira et al. | 106/31.27 |
| 5,121,141 | 6/1992 | Hadimoglu et al. | 346/140 R |
| 5,122,187 | 6/1992 | Schwarz et al. | 106/25 |
| 5,124,718 | 6/1992 | Koike et al. | 346/1.1 |
| 5,151,120 | 9/1992 | You et al. | 106/31.29 |
| 5,302,439 | 4/1994 | Malhotra et al. | 428/195 |
| 5,409,530 | 4/1995 | Kanbayashi et al. | 106/31.29 |
| 5,451,458 | 9/1995 | Malhotra | 428/412 |
| 5,709,976 | 1/1998 | Malhotra | 430/124 |

*Primary Examiner*—Mark L. Bell
*Assistant Examiner*—Veronica Faison
*Attorney, Agent, or Firm*—E. O. Palazzo

[57] ABSTRACT

An ink comprised of (1) a liquid aldehyde, a liquid acid, or mixtures thereof, (2) a solid additive aldehyde compound, a solid additive acid compound, or mixtures thereof, (3) a lightfastness UV absorber, (4) a lightfastness antioxidant, and (5) a colorant.

20 Claims, No Drawings

5,931,995

1

INK COMPOSITIONS

REFERENCE TO PATENT APPLICATIONS

Hot melt inks are illustrated in U.S. Pat. No. 5,683,312, U.S. Pat. No. 5,667,568, U.S. Pat. No. 5,700,316, U.S. Pat. No. 5,747,554, and U.S. Ser. No. 641,866 (D/95458), the disclosures of each being totally incorporated herein by reference.

Hot melt inks are also disclosed in applications U.S. Ser. Nos. 08/933,914, 08/935,889, 08/935,639 and 08/936,084, the disclosures of each application being totally incorporated herein by reference in their entireties.

A number of the components of the applications, such as the colorants, ink additives, and the like may be selected for the inks of the present invention in embodiments thereof.

BACKGROUND OF THE INVENTION

The present invention is directed to ink compositions and, more specifically, the present invention relates to semi-solid hot melt inks with for example, a melting point of from between about 25° C. and about, 50, preferably to about 40° C., especially useful for acoustic ink printing, processes and apparatuses, reference, for example, U.S. Pat. No. 5,121, 141, U.S. Pat. No. 5,111,220, U.S. Pat. No. 5,128,726, U.S. Pat. No. 5,371,531, the disclosures of which are totally incorporated herein by reference, including especially acoustic ink processes as illustrated in a number of the aforementioned applications and patents, such as an acoustic ink printer for printing images on a record medium.

The inks of the present invention in embodiments thereof are comprised of (1) a liquid non-aqueous vehicle with a boiling point of higher than about, or about equal to 150° C. and lower than about, or about equal to 350° C., and more specifically from about 175 to about 325 degrees Centigrade, and yet more specifically from about 225 to about 300 degrees Centigrade, and with a low acoustic loss to for example, reduce, or minimize energy consumption, and which acoustic loss is below, or about equal to 60 dB/mm, (2) a solid additive that can be contained in the ink, or a substrate, such as paper pores and with a melting point of lower than about, or equal to about 75° C. and preferably between about 35 to about 74° C. and with a low acoustic loss to reduce, or minimize energy consumption, and which acoustic loss is for example, below about, or equal to about 100 dB/mm, (3) a light fastness UV absorber, (4) a light fastness antioxidant, (5) and a colorant such as a dye, a pigment or mixtures thereof. More specifically, the present invention is directed to semi-solid hot melt acoustic ink compositions comprised of (1) non-aqueous liquid vehicles having a boiling point higher than about 150° C. and lower than about 350° C., preferably between about 170 to about 300° C., and with low an acoustic loss below about 60 dB/mm, and preferably in the range of from about 5 to about 40 dB/mm, (2) a non-aqueous solid additive with a melting point of lower than about 75° C. and preferably between about 35 and 74° C., with a low acoustic loss below about (throughout below, and higher include about equal to also) 100 dB/mm, and preferably in the range of from about 25 to about 80 dB/mm, (3) a UV absorber, (4) an antioxidant, (5) a colorant, and wherein there can be generated with such inks excellent developed images on plain and coated papers with acceptable image permanence, excellent projection efficiency on transparencies without a post fusing step, and excellent crease resistance, and wherein the inks possess acceptable, and in embodiments superior lightfastness, and superior waterfastness. Moreover, in embodiments of the present invention there is enabled the elimination, or minimization of undesirable paper curl since water need not be present in the invention inks, and it is preferred that there be an absence of water, and since water is not present in the inks a dryer can be avoided thereby minimizing the cost of the acoustic ink jet apparatus and process.

PRIOR ART

In acoustic ink printing, the printhead generates for example, approximately 2.2 picoliter droplets by an acoustic energy process. The ink under these conditions should preferably display a melt viscosity of about 5 to about 20 centipoise or less at the jetting temperature. Furthermore, once the ink is jetted onto the paper, the ink image should be of excellent crease property, and should be non-smearing waterfast, of excellent transparency and excellent fix qualities. In selecting an ink for such applications, it is desirable that the vehicle display a low melt viscosity, such as from about 1 centipoise to about 25 centipoise in the acoustic head, while also displaying solid like properties after being jetted onto paper. Since the acoustic head can tolerate a temperature up to about 180° C., and preferably up to a temperature of from about 140° C. to about 160° C., the vehicle for the ink should preferably display liquid like properties, such as a viscosity of from about 1 to about 10 centipoise at a temperature of from about 75° C. to about 165° C., and solidify or harden after jetting onto paper such that the ink displays a hardness value of from about 0.1 to about 0.5 millimeter, which hardness is determined by a penetrometer according to the ASTM penetration method D1321.

Ink jet printing processes that select inks that are solid at room temperature and liquid at elevated temperatures are known. For example, U.S. Pat. No. 4,490,731, the disclosure of which is totally incorporated herein by reference, discloses an apparatus for dispensing certain solid inks for printing on a substrate such as paper. The ink dye vehicle is usually selected with a melting point above room temperature so that the ink which is melted in the apparatus will not be subject to evaporation or spillage during periods of nonprinting. The vehicle selected possesses a low temperature to permit the use of the solid ink in a thermal ink jet printer. In thermal ink jet printing processes employing hot melt inks, the solid ink is melted by a heater in the printing apparatus and utilized as a liquid in a manner similar to that of conventional thermal ink jet printing. Upon contact with the printing substrate, the molten ink solidifies rapidly, enabling the dye to remain on the surface instead of being carried into the paper by capillary action, thereby attempting to enable higher print density than is generally obtained with liquid inks. Hot melt ink jets are somewhat similar to thermal ink jets, however, a hot melt ink usually contains no solvent. Thus, rather than being liquid at room temperature, a hot melt ink is typically a solid or semi-solid possessing a wax-like consistency. These inks usually need to be heated, for example, to approximately 100° C. before the ink melts and is converted into a liquid. With hot melt inks, a plurality of ink jet nozzles are provided in a printhead. A piezoelectric vibrating element is located in each ink channel upstream from a nozzle so that the piezoelectric oscillations propel ink through the nozzle. After the hot melt ink is applied to the substrate, the ink is resolidified by freezing on the substrate.

One advantage of thermal ink jets is their compact design for the integrated electronics section of the printhead. Thermal ink jets are disadvantageous in that the thermal ink has a tendency to soak into a plain paper medium. This can blur the print or thin out the print locally thereby adversely affecting print quality. Problems have been encountered with thermal ink jets in attempting to remove from the ink moisture in a rapid manner so that the ink does not soak into a plain paper medium.

One advantage of a semi-solid hot melt ink jet is their ability to print on coated substrates such as coated papers and overhead transparencies yielding photographic quality images, since for example, the semi-solid hot melt ink quickly spreads on the surface of the coated paper and transparencies.

In addition, U.S. Pat. No. 4,751,528, the disclosure of which is totally incorporated herein by reference, discloses a semi-solid hot melt ink jet system which includes a temperature-controlled platen provided with a heater and a thermoelectric cooler electrically connected to a heat pump and a temperature control unit for controlling the operation of the heater and the heat pump to maintain the platen temperature at a desired level.

Further, U.S. Pat. No. 4,791,439, the disclosure of which is totally incorporated by reference, discloses an apparatus for use with semi-solid hot melt inks having an integrally connected ink jet head and reservoir system.

Ink compositions for ink jet printing are known. For example, U.S. Pat. No. 4,840,674, the disclosure of which is totally incorporated herein by reference, discloses an ink composition which comprises a major amount of water, an organic solvent selected from the group consisting of tetramethylene sulfone, 1,1,3,3-tetramethyl urea, 3-methyl sulfolane, and 1,3-dimethyl-2-imidazolidone, which solvent has permanently dissolved therein spirit soluble dyes.

U.S. Pat. No. 5,006,170 and U.S. Pat. No. 5,122,187, the disclosures of each of which are totally incorporated herein by reference, disclose semi-solid hot melt ink compositions suitable for ink jet printing which comprise a colorant, a binder, and a propellant such as hydrazine, cyclic amines, ureas, carboxylic acids, sulfonic acids, aldehydes, ketones, hydrocarbons, esters, phenols, amides, imides, halocarbons, and the like. The inks of the present invention are dissimilar than the aforementioned '179 and '187, in that, for example, the invention vehicle selected displays an important acoustic loss value and a viscosity of from about 1 to about 20, and preferably about 10 centipoise when heated to a temperature of from about 125° C. to about 165° C., such that acoustic energy in the printhead can eject an ink droplet onto paper.

U.S. Pat. No. 5,041,161, the disclosure of which is totally incorporated herein by reference, discloses an ink jet ink which is semi-solid at room temperature.

U.S. Pat. No. 4,853,036 and U.S. Pat. No. 5,124,718 disclose an ink for ink jet recording which comprises a liquid composition essentially comprising colorant, a volatile solvent with a vapor pressure of 1 millimeter Hg or more at 25° C., and a component that is solid at room temperature and having a molecular weight of 300 or more.

SUMMARY OF THE INVENTION

While the known ink compositions and processes may be suitable for their intended purposes, a need remains for acoustic semi-solid hot melt ink compositions suitable for thermal ink jet printing. In addition, there is a need for semi-solid hot melt ink compositions which are compatible with a wide variety of plain papers and generate photographic quality images on coated papers. Further, there is a need for semi-solid hot melt ink compositions which generate high quality, lightfast, and excellent waterfast images on plain papers. There is also a need for semi-solid hot melt ink jet compositions which generate high quality, fast-drying images on a wide variety of plain papers at low cost with high quality text and high quality graphics, and wherein the colorant, such as the dye is retained on the paper surface while the ink vehicle can continue to spread within the paper structure. Further, there is a need for semi-solid hot melt ink jet ink compositions which exhibit minimal feathering. Additionally, there is a need for semi-solid hot melt ink jet ink compositions which exhibit minimal intercolor bleed. There is also a need for semi-solid hot melt ink jet ink compositions which exhibit excellent image permanence. Further, there is a need for semi-solid hot melt ink jet ink compositions which are suitable for use in acoustic ink jet printing processes. Additionally, there is a need for semi-solid hot ink compositions suitable for ink jet printing processes wherein the substrate is heated prior to printing and is cooled to ambient temperature subsequent to printing (delay printing processes). There is also a need for ink compositions suitable for ink jet printing wherein high optical densities can be achieved with relatively low dye concentrations. A need also remains for ink compositions suitable for ink jet printing wherein curling of the substrate, such as paper, subsequent to printing is minimized, or avoided. These and other needs can be achievable with the inks of the present invention in embodiments thereof.

Examples of object of the present invention include, for example:

It is an object of the present invention to provide semi-solid hot melt ink compositions with many of the advantages illustrated herein.

It is another object of the present invention to provide semi-solid hot melt ink compositions suitable for acoustic ink jet printing.

It is yet another object of the present invention to provide semi-solid hot melt ink compositions which are compatible with a wide variety of plain papers and yield photographic quality images on coated papers.

It is still another object of the present invention to provide semi-solid hot melt ink compositions which generate high quality images on plain papers, and wherein there is selected a dye, or wherein the ink vehicle contains acid, or aldehyde functionalities.

Another object of the present invention is to provide semi-solid hot melt ink jet ink compositions comprised of a dye and vehicle comprised of an acid, an aldehyde, and mixtures thereof and wherein in embodiments the inks possess a low viscosity of, for example, from about 5 to about 10 at 160° C.

Yet another object of the present invention is to provide hot ink jet ink compositions which exhibit low viscosity of from about 1 to about 10 centipoise at a temperature of from about 125° C. to about 160° C.

Still another object of the present invention is to provide semi-solid hot melt ink jet ink compositions which exhibit minimal intercolor bleed.

It is another object of the present invention to provide semi-solid hot melt ink jet ink compositions which exhibit excellent waterfast, lightfast image permanence.

It is yet another object of the present invention to provide hot ink jet ink compositions that contain no water and which are suitable for use in acoustic ink jet printing processes.

It is still another object of the present invention to provide hot ink compositions that contain no water, or minimal water, and that are suitable for ink jet printing processes wherein the substrate is heated prior to printing and is cooled to ambient temperature subsequent to printing (heat and delay printing processes).

Another object of the present invention is to provide ink compositions suitable for ink jet printing wherein high optical densities can be achieved with relatively low dye concentrations.

Yet another object of the present invention is to provide water-free semi-solid hot melt ink compositions suitable for ink jet printing wherein curling of the substrate subsequent to printing is minimized.

Another object of the present invention resides in the provision of semi-solid hot melt inks wherein the viscosity of the ink is from about 1 centipoise to about 10 centipoise at, for example, the jetting temperature which can be from about 125° C. to about 180° C., and preferably from 125° C. to about 160° C. thereby enabling excellent jetting at reasonable power levels.

Further, in another object of the present invention there are provided semi-solid hot melt inks with substantially no water and vehicles such as an acid or an aldehyde vehicle and a colorant such as a dye, or a pigment.

Additionally, in another object of the present invention there are provided semi-solid hot melt inks with no water for ink printing methods and apparatuses, and wherein a number of the advantages as illustrated herein are achievable.

The present invention relates to an ink composition comprised of (1) a liquid aldehyde and/or an acid vehicle with for example, an acoustic-loss value of from about 5 to about 40 dB/mm, and a boiling point between about 170 and about 300° C., (2) a solid additive with for example a melting point of less than, or equal to about 75° C., and preferably between about 35 and about 74° C., and with a low acoustic loss of equal to about, or below about 100 dB/mm, and preferably in the range of from about 25 to about 75, a UV absorber, (5) a colorant, which ink has an acoustic-loss value of from about 10 to about 80 dB/mm, possesses a viscosity of for example, of from about 1 centipoise to about 10 centipoise at a temperature of for example, from about 125° C. to about 165° C. Embodiments of the present invention include an ink composition comprised of (1) a liquid aldehyde, a liquid acid, or mixtures thereof, (2) an aldehyde compound, a an acid compound, or mixtures thereof, (3) a lightfastness UV absorber, (4) a lightfastness antioxidant, and (5) a colorant.

DETAILED DESCRIPTION OF THE INVENTION

In embodiments the ink compositions of the present invention comprise a colorant, such as a pigment, a dye, or mixtures thereof, and a liquid vehicle with an acoustic-loss value of less than about, or equal to about 60 dB/mm, and preferably between about 5 to about 40 dB/mm, and a boiling point of greater than, or equal to about 150° C., preferably between about 170 and about 300° C. and a solid additive, which additive for example, evens the surface of paper so that the colorant, such as the dye does not substantially penetrate into the fibers of the paper, and which additive possesses a melting point of lower than, or equal to about 75° C. and preferably between about 35 and about 74° C., an acoustic-loss value of less than about, or equal to about 100 dB/mm and preferably between about 25 to about 80 dB/mm. Mixtures include for example from about 1 to about 99 parts or percent of one component, and from about 99 to about 1 percent, or parts of a second component.

The liquid aldehyde or the liquid acid vehicle with for example a boiling point of higher than about 150° C. and preferably between about 170 and about 300° C. and with an acoustic-loss value of from about 5 to about 40 B/mm is present in the ink composition in a suitable amount, for example, in an amount of from about 55 to about 1 percent by weight, the solid additive with a melting point of between about 35 to about 74° C., and having an acoustic-loss value of below about 100 dB/mm and preferably from about 25 to about 80 dB/mm is present in an amount of from about 5 to about 97 percent by weight, the UV absorber is present for example, in an amount of from about 10 to about 0.5 percent by weight, the antioxidant is present for example, in an amount of from about 10 to about 0.5 percent by weight, and the colorant is present in an amount of for example, from about 20 to about 1, and preferably from about 2 to about 12 percent by weight. The ink compositions containing (1) a low acoustic-loss vehicle, (2) a solid additive, (3) a lightfast UV absorber, (4) a lightfast antioxidant, and (5) a colorant, has for example the following range amounts in embodiments [55+5+10+10+20=100] to [1+97+0.5+0.5+1=about 100], wherein the 55 represents the vehicle, the 5 represents the solid additive, (2) the 10 represents the UV absorber, the second 10 represents the antioxidant, and the 20 represents the colorant.

In preferred embodiments an acid vehicle with for example, a boiling point of higher than about 150° C. and preferably between about 170 and about 300° C. and with for example, an acoustic-loss value of from about 5 to about 40 dB/mm is present in an amount of for example, from about 50 to about 20 percent by weight, the solid additive aldehyde or acid compound (2) having a melting point of less than about 75° C. and preferably with a melting point of between about 35 and about 74° C., and having an acoustic-loss value of for example, below 100 dB/mm and preferably from about 25 to about 80 dB/mm is present in an amount of from about 30 to about 78 percent by weight, the UV absorber is present in an amount of from about 5 to about 0.5 percent by weight, the antioxidant is present in an amount of from about 5 to about 0.5 percent by weight, and the colorant is present in an amount of from about 10 to about 1 percent by weight. Amounts within and outside the ranges specifically indicated may also be selected in embodiments The ink composition containing (1) a low acoustic-loss vehicle, (2) a paper additive, (3) a lightfast UV absorber, (4) a lightfast antioxidant, and (5) a colorant, has the following preferred range amounts in sequence for (1), (2), (3), (4), and (5): [50+30+5+5+10=100] to [20+78+0.5+0.5+1=100]. These composition ranges were established using a statistical design based on the experimental data of the viscosity at 150° C., jettability at 150° C., image quality, lightfastness, and waterfastness of various compositions.

Embodiments of the present invention include an ink composition comprised of a liquid acid vehicle with an acoustic-loss value of from about 5 to about 40 dB/mm and a boiling point of greater than about, or equal to about 150° C. and which acid selected from the group consisting of (1) hexanoic acid, (Aldrich #H1,213-7), (2) 5-ketohexanoic acid (Aldrich #A1,320-4), (3) perfluoro heptanoic acid, (Aldrich #34,204-1), (4) octanoic acid, (Aldrich #15,375-3), (5) nonanoic acid, (Aldrich #24,868-1), (6) undecanoic acid, (Aldrich #17,147-6), (7) 2-octenoic acid, (Aldrich #O,520-9), (8) 2-octynoic acid, (Aldrich #28,673-7), and (9) 9-hexadecenoic acid, (Aldrich #26,692-3).

Embodiments of the present invention include an ink composition comprised of a liquid aldehyde vehicle with an acoustic-loss value of from about 5 to about 40 dB/mm and having a boiling point of greater than about 150° C. and which aldehyde is selected from the group consisting of (1) octyl aldehyde, (Aldrich #O,560-8), (2) decyl aldehyde, (Aldrich #D22,200-3), (3) dodecyl aldehyde, (Aldrich #D22,200-3), (4) tetradecyl aldehyde, (Aldrich #T1000-6), (5) benzaldehyde, (Aldrich #B133-4), (6) 2-chloro benzaldehyde, (Aldrich #12,497-4), (7) 3-chloro benzaldehyde, (Aldrich #C2,340-3), (8) 2-bromo benzaldehyde, (Aldrich #B5,700-1), (9) 3-bromo benzaldehyde, (Aldrich #B5,720-6), (10) 3-methoxy benzaldehyde, (Aldrich #12,965-8), (11) 4-methoxy benzaldehyde, (Aldrich #A8,810-7), (11) 2-methyl benzaldehyde, (Aldrich #11,755-2), (12) 3-methyl benzaldehyde, (Aldrich #T3,550-5), (13) 4-methyl benzaldehyde, (Aldrich #T3,560-2), (14) 4-acetoxy benzaldehyde, (Aldrich #24,260-8), (15) 4-phenoxy benzaldehyde, (Aldrich #21,126-5), (16) 3-phenoxy benzaldehyde, (Aldrich #19,175-2), (17) 2-ethoxy benzaldehyde, (Aldrich #15,372-9), (18) 4-ethoxy benzaldehyde, (Aldrich #17,360-6), (19) 4-butoxybenzaldehyde, (Aldrich #23,808-2), (20) 2-hydroxybenzaldehyde, (Aldrich #S35-6), (21) 1,2,3,6-tetrahydrobenz aldehyde, (Aldrich #T1220-3), (22) trans-cinnamaldehyde, (Aldrich #23,996-8), (23) α-chlorocinnamaldehyde, (24) 2,3,5,6-tetrafluoro benzaldehyde, (Aldrich #32,893-6), (25) 3-[3-(trifluoromethyl)phenoxy] benzaldehyde, (Aldrich #19,539-1), (26) diphenyl acetaldehyde, (Aldrich #D20,425-0), (27) citral, (Aldrich #C8,300-7), (28) 5-methyl-2-phenyl-2-hexenal, (CAS #21834-92-4), (29) 2-methyl-3-ρ-tolylpropion aldehyde, (CAS #6251-78-8), (30) hydroxy citronellal dimethylacetal, (CAS #141-92-4), (31) 2,6-dimethyl-5-heptenal, (CAS #106-72-9), and (32) 2-phenylpropion aldehyde, (Aldrich #24,136-9).

In embodiments the present invention relates to inks with a liquid acid vehicle with an acoustic-loss value of from about 5 to about 40 dB/mm and which acid is selected from the group consisting of (1) hexanoic acid, (2) 5-ketohexanoicacid, (3) perfluoro heptanoic acid, (4) octanoic acid, (5) nonanoic acid, (6) undecanoicacid, (7) 2-octenoicacid, (8) 2-ctynoicacid, and (9) 9-hexadecenoic acid; wherein the liquid aldehyde vehicle with for example, an acoustic-loss value of from about 5 to about 40 dB/mm is selected from the group consisting of (1) octyl aldehyde, (2) decyl aldehyde, (3) dodecyl aldehyde, (4) tetradecyl aldehyde, (5) benzaldehyde, (6) 2-chloro benzaldehyde, (7) 3-chloro benzaldehyde, (8) 2-bromo benzaldehyde, (9) 3-bromo benzaldehyde, (10) 3-methoxy benzaldehyde, (11) 4-methoxybenzaldehyde, (11) 2-methylbenzaldehyde, (12) 3-methyl benzaldehyde, (13) 4-methyl benzaldehyde, (14) 4-acetoxy benzaldehyde, (15) 4-phenoxy benzaldehyde, (16) 3-phenoxy benzaldehyde, (17) 2-ethoxybenzaldehyde, (18) 4-ethoxy benzaldehyde, (19) 4-butoxybenzaldehyde, (20) 2-hydroxy benzaldehyde, (21) 1,2,3,6-tetrahydrobenzaldehyde, (22) trans-cinnamaldehyde, (23) α-chlorocinnam aldehyde, (24) 2,3,5,6-tetrafluorobenzaldehyde, (25) 3-[3-(trifluoromethyl) phenoxy]benzaldehyde, (26) diphenyl acetaldehyde, (27) citral, (28) 5-methyl-2-phenyl-2-hexenal, (29) 2-methyl-3-polylpropionaldehyde, (30) hydroxycitronellaldimethyl acetal, (31) 2,6-dimethyl-5-heptenal, or (32) 2-phenyl propionaldehyde; wherein the solid additive with for example, a melting point of from about 35 to about 74° C. is selected from the group consisting of (1) 2-hydroxyhexanoic acid, (2) 6-oxohepanoic acid, (3) 6,8 dithiooctanoic acid, (4) 7-oxooctanoic acid, (5) hepta deca fluoro nonanoic acid, (6) decanoic acid, (7) tridecanoic acid, (8) pentadecanoic acid, (9) hepta decanoic acid, (10) erucic acid, (11) 10-undecynoic acid, (12) nervonic acid, (13) tiglic acid, (14) eladic acid, (15) 6-(carbobenzyloxyamino)caproic acid, (16) N-carbobenzyloxy-L-isoleucine, (17) N-carbobenzyloxy-2-methylalanine, (18) N-carbobenzyloxy-L-tyrosine hydrate, (19) carbo benzyloxy-L-valine, (20) (N-(tert-butoxy carbonyl)-L-isoleucine, (21) (N-(tert-butoxycarbonyl)-L-methionine, (22) 2-bromoacrylic acid, (23) cis-3-chloroacrylic acid, (24) 3,3-dimethylacrylic acid, (25) 2-(trifluoromethyl) acrylic acid, (26) 2,3-dibromopropionic acid, (27) (±)-α-(tert-butyl) hydrocinnamic acid, and (28) trans-2-methyl-2-pentenoicacid; wherein the solid additive aldehyde compound with a melting point of about 35 to about 74° C. is selected from the group consisting of (1) 3-fluoro-ρ-anisaldehyde, (2) 4-diethyl amino benzaldehyde, (3) 2-methoxybenzaldehyde, (4) 2,3,4-trimethoxybenzaldehyde, (5) 3,4-dimethoxy benzaldehyde, (6) 3,5-dimethoxy benzaldehyde, (7) 2,3-dimethoxy benzaldehyde, (8) 2,5-dimethoxy benzaldehyde, (9) 2,4-dimethoxy-3-methylbenzaldehyde, (10) 4-chloro benzaldehyde, (11) 4-bromobenzaldehyde, (12) 3-bromo-4,5-dimethoxybenzaldehyde, (13) 3-benzyloxy benzaldehyde, (14) 2-benzyloxy-3-methoxybenzaldehyde, (15) 3-benzyloxy-4-methoxybenzaldehyde, (16) 4-benzyloxy-3-methoxy benzaldehyde, (17) 3-ethoxy-4-methoxybenzaldehyde, (18) 2-hydroxy-3-methoxybenzaldehyde, (19) 2-hydroxy-4-methoxy benzaldehyde, and (20) α-bromo cinnamaldehyde; wherein the lightfastness UV absorbing compound is selected from the group consisting of (1) 2-(2'-hydroxy-5'-methylphenyl) benzotriazole, (2) 2-[2'-hydroxy-3,5-di-(1,1-dimethyl benzyl) phenyl]-2H-benzotriazole, (3) bis[2-hydroxy-5-tert-octyl-3-(benzotriazol-2-yl) phenylmethane, (4) 2-(3',5'-di-tert-butyl-2'-hydroxyphenyl)-5-chlorobenzotriazole, (5) 2-(4-benzoyl-3-hydroxyphenoxy)ethylacrylate), (6) tris(3,5-di-tert-butyl-4-hydroxy benzyl)isocyanurate, wherein the lightfast antioxidant compound is selected from the group consisting of (1) bis-(1,2,3,6-tetrahydrobenzaldehyde) pentaerythritol acetal, (2) dioctadecyl 3,3'-thio dipropionate, (3) 2,2,4-trimethyl-1,2-hydroquinoline, (4) octylated diphenylamine, (5) N,N'-β,β'-naphthalene-ρ-phenylenediamine, (6) ethyl(R)-(+)-2-{4-[trifluoromethyl) phenoxy]phenoxy}propionate, and (7) 3-hydroxy-2,2-dimethylpropyl-3-hydroxy-2,2-dimethylpropionate; or wherein the solid additive acid compound with a melting point of less than 75° C. and preferably from about 35 to about 74° C. and with an acoustic-loss value of below 100 dB/mm and preferably from about 25 to about 80 dB/mm include (1) 2-hydroxyhexanoicacid, (Aldrich #21,980-0), (2) 6-oxoheptanoic acid, (Aldrich #39,936-1), (3) 6,8 dithiooctanoic acid, (Aldrich #T2,860-6), (4) 7-oxooctanoic acid, (Aldrich #34,362-5), (5) hepta deca fluoro nonanoic acid, (Aldrich #39,445-9), (6) decanoic acid, (Aldrich #D165-3), (7) tridecanoic acid, (Aldrich #T5,760-6), (8) pentadecanoic acid, (Aldrich #P360-0), (9) hepta decanoic acid, (Aldrich #H100-0), (10) erucic acid, (Aldrich #85,843-9), (11) 10-undecynoic acid, (Aldrich #40,654-6), (12) nervonic acid, (Aldrich #28,682-6), (13) tiglic acid, (Aldrich #T3,520-3), (14) eladic acid, (Aldrich #E30-4), (15) 6-(carbobenzyloxyamino) caproicacid, (Aldrich #29,952-9), (16) N-carbobenzyloxy-L-isoleucine, (Aldrich #40,853-0), (17) N-carbobenzyloxy-2-methylalanine, (Aldrich #37,094-0), (18) N-carbobenzyloxy-L-tyrosinehydrate, (Aldrich #40,849-2), (19) carbobenzyloxy-L-valine, (Aldrich #29,352-0), (20) (N-(tert-butoxy carbonyl)-L-isoleucine, (Aldrich #40,853-0), (21) (N-(tert-butoxycarbonyl)-L-methionine, (Aldrich #40,842-5), (22) 2-bromoacrylicacid, (Aldrich #33,842-7), (23) cis-3chloroacrylic acid, (Aldrich #17,740-7), (24) 3,3-dimethylacrylic acid, (Aldrich #D13,860-6), (25) 2-(trifluoromethyl)acrylicacid, (Aldrich #36,914-4), (26) 2,3-dibromo propionic acid, (Aldrich #13,994-7), (27) (±)-α-(tert-butyl) hydrocinnamic acid, (Aldrich #34,002-2), or

(28) fresh fruit flavor compounds such as trans-2-methyl-2-pentenoic acid, (Aldrich #26,477-6).

The solid additive aldehyde compounds with for example, a melting point of less than, or equal to about 75° C. and preferably from about 35 to about 74° C. and preferably an acoustic-loss value of less than 100 dB/mm and preferably from about 25 to about 80 dB/mm include: (1) 3-fluoro-p-anisaldehyde, (Aldrich #15,558-6), (2) 4-diethyl amino benzaldehyde, (Aldrich #D8,625-6), (3) 2-methoxy benzaldehyde, (Aldrich #10,962-2), (4) 2,3,4-trimethoxy benzaldehyde, (Aldrich #15,209-9), (5) 3,4-dimethoxy benzaldehyde, (Aldrich #14,375), (6) 3,5-dimethoxy benzaldehyde, (Aldrich #12,629-2), (7) 2,3-dimethoxy benzaldehyde, (Aldrich #D13,020-6), (8) 2,5-dimethoxy benzaldehyde, (Aldrich #D13,060-5), (9) 2,4-dimethoxy-3-methylbenzaldehyde, (Aldrich #29,627-9), (10) 4-chlorobenzaldehyde, (Aldrich #11,221-6), (11) 4-bromobenzaldehyde, (Aldrich #B5,740-0), (12) 3-bromo-4,5-dimethoxybenzaldehyde, (Aldrich #13,061-3), (13) 3-benzyloxybenz aldehyde, (Aldrich #B2,700-5), (14) 2-benzyloxy-3-methoxy benzaldehyde, (Aldrich #43,479-5), (15) 3-benzyloxy-4-methoxy benzaldehyde, (Aldrich #16,395-3), (16) 4-benzyloxy-3-methoxy benzaldehyde, (Aldrich #16,361-9), (17) 3-ethoxy-4-methoxy benzaldehyde, (Aldrich #25,275-1), (18) 2-hydroxy-3methoxybenzaldehyde, (Aldrich #12080-4), (19) 2-hydroxy-4-methoxy benzaldehyde, (Aldrich #16,069-2), (20) α-bromo cinnamaldehyde, (Aldrich #16,116-0), (21) vanilla flavor compounds such as ethyl vanillin, (Aldrich #12,809-0), and the like.

The lightfast UV absorbers in the ink composition include for example, (1) 2-(2'-hydroxy-5'-methylphenyl) benzotriazole, available as Tinuvin 900, from Ciba Geigy Corporation; (2) 2-[2'-hydroxy-3,5-di-(1,1-dimethylbenzyl) phenyl]-2H-benzotriazole, available as Topanex 100 BT, from ICI America Corporation; (3) bis[2-hydroxy-5-tert-octyl-3-(benzotriazol-2-yl) phenyl methane, available as Mixxim BB/100, from Fairmount-Corporation; (4) 2-(3',5'-di-tert-butyl-2'-hydroxyphenyl)-5-chlorobenzo triazole, available as Tinuvin 327, from Ciba Geigy Corporation; (5) 2-(4-benzoyl-3-hydroxyphenoxy)ethylacrylate (Cyasorb UV-416, #41,321-6, available from Aldrich Chemical Company), (6) tris(3,5-di-tert-butyl-4-hydroxybenzyl) isocyanurate, available as Good-rite UV 3114, from Goodrich Chemicals, and the like.

The lightfast antioxidants of the ink compositions include for example: (1) bis-(1,2,3,6-tetrahydrobenzaldehyde) pentaerythritol acetal, available as Vulkazon AFS/IG, from Mobay Corporation; (2) dioctadecyl 3,3'-thiodipropionate, available as Cyanox, STDP, #41,310-0, from Aldrich Chemical Company; (3) 2,2,4-trimethyl-1,2-hydroquinoline, available as Vulkanox HS, from Mobay Corporation; (4) octylated diphenylamine, available as Anchor ODPA, from Anchor Corporation; (5) N,N'-β,β'-naphthalene-p-phenylenediamine, available as Anchor DNPD, from Anchor Corporation; (6) ethyl(R)-(+)-2-{4-[trifluoromethyl)phenoxy]phenoxy}propionate, (Aldrich #25,074-0); (7) 3-hydroxy-2,2-dimethylpropyl-3-hydroxy-2,2-dimethylpropionate, (Aldrich #39,024-0), and the like.

Suitable colorants, present in an effective amount generally of from about 1 to about 25, and for example from about 2 to about 12 percent by weight, include pigments and dyes, pigments, dyes, mixtures of pigments, mixtures of dyes, and the like with solvent dyes being preferred. Any dye or pigment may be selected providing for example that it is capable of being dispersed or dissolved in the vehicle and is compatible with the other ink components.

Examples of suitable pigments include Violet Toner VT-8015 (Paul Uhlich), Paliogen Violet 5100 (BASF), Paliogen Violet 5890 (BASF), Permanent Violet VT 2645 (Paul Uhlich), Heliogen Green L8730 (BASF), Argyle Green XP-111-S (Paul Uhlich), Brilliant Green Toner GR 0991 (Paul Uhlich), Lithol Scarlet D3700 (BASF), Toluidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871 K (BASF), Paliogen Red 3340 (BASF), Lithol Fast Scarlet L4300 (BASF), Heliogen Blue L6900, L7020 (BASF), Heliogen Blue K6902, K6910 (BASF), Heliogen Blue D6840, D7080 (BASF), Sudan Blue OS (BASF), Neopen Blue FF4012 (BASF), PV Fast Blue B2G01 (American Hoechst), Irgalite Blue BCA (Ciba-Geigy), Paliogen Blue 6470 (BASF), Sudan III (Red Orange), (Matheson, Colemen Bell), Sudan II (Orange), (Matheson, Colemen Bell), Sudan Orange G (Aldrich), Sudan Orange 220 (BASF), Paliogen Orange 3040 (BASF), Ortho Orange OR 2673 (Paul Uhlich), Paliogen Yellow 152,1560 (BASF), Lithol Fast Yellow 0991K (BASF), Paliotol Yellow 1840 (BASF), Novoperm Yellow FGL (Hoechst), Permanent Yellow YE 0305 (Paul Uhlich), Lumogen Yellow D0790 (BASF), Suco-Yellow L1250 (BASF), Suco-Yellow D1355 (BASF), Suco Fast Yellow D1355, D1351 (BASF), Hostaperm Pink E (American Hoechst), Fanal Pink D4830 (BASF), Cinquasia Magenta (Du Pont), Paliogen Black L0084 (BASF), Pigment Black K801 (BASF), and carbon blacks such as Regal 330® (Cabot), Carbon Black 5250, Carbon Black 5750 (Columbia Chemical Company).

Examples of suitable dyes include Pontamine; Food Black 2; Carodirect Turquoise FBL Supra Conc. (Direct Blue 199), available from Carolina Color and Chemical; Special Fast Turquoise 8 GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E6- BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton and Knowles; Cartasol Yellow GTF Presscake, available from Sandoz, Inc.; Tartrazine Extra Conc. (FD&C Yellow #5, Acid Yellow #23), available from Sandoz, Inc.; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon; Basacid Black X 34, available from BASF; Carta Black 2GT, available from Sandoz, Inc.; and the like.

Particularly preferred are solvent dyes, and within the class of solvent dyes, spirit soluble dyes are preferred primary because of their compatibility with the ink vehicles. Examples of suitable spirit solvent dyes include Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company). Levanol Brilliant Red 3BW (Mobay Chemical Company), Levaderm Lemon Yellow (Mobay Chemical Company), Spirit Fast Yellow 3G, Aizen Spilon Yellow C-GNH (Hodagaya Chemical Company), Sirius Supra Yellow GD 167, Cartasol Brilliant Yellow 4GF (Sandoz), Pergasol Yellow CGP (Ciba-Geigy), Orasol Black RLP(Ciba-Geigy), Savinyl Black RLS (Sandoz), Dermacarbon 2GT(Sandoz), Pyrazol Black BG (ICI), Morfast Black Conc.A (Morton-Thiokol), Diaazol Black RN Quad (ICI), Orasol Blue GN (Ciba-Geigy), Savinyl Blue GLS (Sandoz), Luxol Blue MBSN (Morton-Thiokol), Sevron Blue 5GMF (ICI), Basacid Blue 750 (BASF), and the like.

Optional ink additives include biocides such as Dowicil 150, 200, and 75, benzoate salts, sorbate salts, and the like, present in effective amounts, such as for example an amount of from about 0.0001 to about 2 percent by weight, and preferably from about 0.01 to about 1.0 percent by weight. The amount of biocide is generally present in amounts of from about 10 to 25 milligrams per one gram of ink. Other ink additives, such as humectants, and the like can also be incorporated into the inks.

The vehicle may be comprised of a mixture of the acid, and the aldehyde, and which mixture contains for example, form about 1 to about 99 weight percent or parts of each component, and preferably from about 40 to about 60 weight percent of each component. Acids for the vehicle include hydroxy acids, such as 12-hydroxystearic acid, 12-hydroxydodecanoic acid, and the like, and 2-acetoxysuccinic anhydride, 2-hydroxy N-methyl succinimide, and the like.

The inks of the present invention can be prepared by any suitable method. A colored semi-solid hot melt ink composition can be prepared by for example, mixing 46 percent by weight of a liquid vehicle with an acoustic-loss value of about 5 to about 40 dB/mm and a boiling point of greater than 150° C., 42 percent by weight of a solid additive with a melting point of lower than 75° C. and an acoustic-loss value of less than about 100 dB/mm, 3 percent by weight of a lightfast UV absorber, 3 percent by weight of lightfast antioxidant and 6 percent by weight of a colorant. The mixture is then heated to a temperature of about 100° C. and stirred for a period of about 60 minutes until it forms a homogeneous solution, and subsequently it is cooled to 25° C.

The inks of the present invention are particularly suitable for printing processes wherein the substrate, such as plain paper, coated paper, transparency, or the like, is heated during the printing process to facilitate formation of the liquid crystalline phase within the ink. When transparency substrates are employed, temperatures typically are limited to a maximum of about 100° C. to about 110° C., since the polyester typically employed as the base sheet in transparency sheets tends to deform at higher temperatures specially formulated transparencies and paper substrates can, however, tolerate higher temperatures, and frequently are suitable for exposure to temperatures of 150° C. or even 200° C. in some instances. Typical heating temperatures are from about 40° C. to about 140° C., and preferably from about 60° C. to about 95° C., although the temperature can be outside these ranges.

The inks of the present invention are also suitable for use in acoustic ink jet printing processes. In acoustic ink jet printing, reference a number of the applications and patents recited here, the disclosures of which have been totally incorporated herein by reference, an acoustic beam exerts a radiation pressure against objects upon which it impinges. Thus, when an acoustic beam impinges on a free surface of the ink of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power, reference, for example, IBM Technical Disclosure Bulletin, Vol. 16, No. 4, September 1973, pages 1168 to 1170, the disclosure of which is totally incorporated herein by reference. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure, which each of the beams exerts against the free ink surface, to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. The size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered.

Pixel placement accuracy problems that conventional drop on demand and continuous stream ink jet printers have suffered. The size of the ejection orifice is a critical design parameter of an ink jet because it determines the size of the droplets of ink that the jet ejects. As a result, the size of the ejection orifice cannot be increased without sacrificing resolution. Acoustic printing has increased intrinsic reliability since usually there are no nozzles to clog. Furthermore, small ejection orifices are avoided, so acoustic printing can be performed with a greater variety of inks than conventional ink jet printing, including inks having higher viscosity's and inks containing pigments and other particulate components.

Acoustic ink printers embodying printheads comprising acoustically illuminated spherical focusing lenses can print precisely positioned pixels (picture elements) at resolutions which are sufficient for high quality printing of relatively complex images. It has also been determined that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of page width ejector arrays, ranging from (i) single row, sparse arrays for hybrid forms of parallel/serial printing to (ii) multiple row staggered arrays with individual ejectors for each of the pixel positions or addresses within a page width image field (i.e., single ejector/pixel/line) for ordinary line printing. Inks suitable for acoustic ink jet printing typically are liquid at ambient temperatures (i.e., about 25° C.), however in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in J. Appl. Phys., vol. 65, no. 9 (May 1, 1989) and references therein, the disclosure of which is totally incorporated herein by reference.

Acoustic-loss Measurements recited herein were measured as follows: samples of various liquid vehicles and solid additives (2) or surface leveling compounds were placed between the two transducers with the temperature set at 150° C. The samples were allowed to equilibrate at 150° C. for five minutes. The two transducers were brought together to maximize the acoustic signal. The amplitude and the position of the signals were recorded. The two transducers were separated by a distance varying from 25.4 microns to 125.4 microns recording each time the amplitude and the position of the signal. Each measurement was performed three times and three samples of the same material were measured. The attenuation dB/mm was then calculated by ratioing the amplitude values obtained at different separation distances. The liquid acids and liquid aldehydes had dB/mm values of for example, from about 20 to 40, whereas the solid acids and aldehydes had dB/mm values of for example, of from about 40 to about 55.

The optical density measurements recited herein were obtained on a Pacificpectrograph Color System. The system consists of two major components, an optical sensor and a data terminal. The optical sensor employs a 6 inch integrating sphere to provide diffuse illumination and 8 degrees viewing. This sensor can be used to measure both transmission and reflectance samples. When reflectance samples are measured, a specular component may be included. A high resolution, full dispersion, grating monochromator was used to scan the spectrum from 380 to 720 nanometers. The data terminal features a 12 inch CRT display, numerical keyboard for selection of operating parameters and the entry of tristimulus values, and an alphanumeric keyboard for entry of product standard information The lightfast values of the ink jet images were measured in the Mark V Lightfast Tester obtained from Microscal Company, London, England.

The waterfast values of the ink jet images were obtained from the optical density data recorded before and after washing with hot [50° C.] water for two minutes.

Water may be selected for the inks of the present invention, however preferably little or no water is present.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE 1

A black semi-solid hot melt ink composition was prepared by mixing 46 percent by weight of the liquid vehicle hexanoic acid, (Aldrich #H1,213-7), with an acoustic-loss value of 25 dB/mm and a boiling point of 202° C., 42 percent by weight of the solid acid (2) additive 2-hydroxyhexanoic acid, (Aldrich #21,980-0), having a melting point of 62° C. (Centigrade throughout) and an acoustic-loss value of 40 dB/mm, 3 percent by weight of the UV absorber 2-(4-benzoyl-3-hydroxyphenoxy)ethylacrylate (Cyasorb UV-416, #41,321-6, Aldrich Chemical Company) melting point 78° C., 3 percent by weight of the antioxidant 3-hydroxy-2,2-dimethylpropyl-3-hydroxy-2,2-dimethyl propionate, (Aldrich #39,024-0), melting point 52° C., and 6 percent by weight of the colorant Orasol Black RLP (Ciba-Geigy). The resulting mixture was heated to a temperature of about 10° C. and stirred for a period of about 60 minutes until it formed a homogeneous solution, and subsequently the mixture was cooled to 25° C. The resulting black ink possessed an acoustic loss value of 45 dB/mm and a viscosity of 5 cps at 150° C.

EXAMPLE 2

A blue semi-solid hot melt ink composition was prepared by mixing 46 percent by weight of the liquid vehicle nonanoic acid, (Aldrich #24, 868-1), with an acoustic-loss value of 30 dB/mm and a boiling point of 254° C., 42 percent by weight of (2) the solid acid additive pentadecanoic acid, (Aldrich #P360-0) and with a melting point of 52° C. and an acoustic-loss value of 45 dB/mm, 3 percent by weight of the UV absorber 2-(4-benzoyl-3-hydroxy phenoxy)ethylacrylate (Cyasorb UV-416, #41,321-6, Aldrich Chemical Company) melting point 78° C., 3 percent by weight of the antioxidant dioctadecyl-3,3'-thiodipropionate, (Cyanox, STDP, #41,310-0, Aldrich Chemical), melting point 66° C., and 6 percent by weight of the colorant Sudan Blue dye (BASF).The mixture was heated to a temperature of about 100° C. and stirred for a period of about 60 minutes until it formed a homogeneous solution, and subsequently was cooled to 25° C. The resulting blue ink had an acoustic loss value of 45 dB/mm and a viscosity of 5.2 cps at 150° C.

EXAMPLE 3

A yellow semi-solid hot melt ink composition was prepared by mixing 46 percent by weight of the liquid acid vehicle 5-ketohexanoic acid, (Aldrich #A1,320-4) with an acoustic-loss value of 32 dB/mm and a boiling point of 275° C., 42 percent by weight of the solid acid additive 6,8 dithiooctanoic acid, (Aldrich #T2,860-6), having a melting point of 60° C. and an acoustic-loss value of 42 dB/mm, 3 percent by weight of the UV absorber 2-(4-benzoyl-3-hydroxyphenoxy)ethylacrylate (Cyasorb UV-416, #41,321-6, Aldrich Chemical Company) melting point 78° C., 3 percent by weight of the antioxidant 3-hydroxy-2,2-dimethylpropyl-3-hydroxy-2,2-dimethylpropionate, (Aldrich #39,024-0), melting point 52° C., and 6 percent by weight of the colorant Sudan yellow dye (BASF). The resulting mixture was heated to a temperature of about 100° C. and then stirred for a period of about 60 minutes until it formed a homogeneous solution, and subsequently was cooled to 25° C. The resulting yellow ink had an acoustic loss value of 48 dB/mm and a viscosity of 4.5 cps at 150° C.

EXAMPLE 4

A red semi-solid hot melt ink composition was prepared by mixing 46 percent by weight of the liquid vehicle octanoic acid, (Aldrich #15,375-3), with an acoustic-loss value of 28 dB/mm and a boiling point of 237° C., 42 percent by weight of the additive tiglic acid, (Aldrich #T3,520-3), with a melting point of 62° C. and an acoustic-loss value of 45 dB/mm, 3 percent by weight of the UV absorber 2-(4-benzoyl-3-hydroxy phenoxy)ethylacrylate (Cyasorb UV-416, #41,321-6, (Aldrich) melting point 78° C., 3 percent by weight of the antioxidant 3-hydroxy-2,2-dimethylpropyl-3-hydroxy-2,2-dimethylpropionate (Aldrich #39,024-0), melting point 52° C., and 6 percent by weight of the colorant Sudan Red dye (BASF). The mixture resulting was heated to a temperature of about 100° C. and stirred for a period of about 60 minutes until it formed a homogeneous solution, and subsequently was cooled to 25° C. The resulting red ink had an acoustic loss value of 45 dB/mm and a viscosity of 5.2 cps at 150° C.

Each of the above four prepared inks were incorporated into an acoustic ink jet printing test fixture utilizing the ejection mechanism disclosed in *J. Appl. Phys.* 65(9), May 1, 1989, and references therein, the disclosure of which are totally incorporated herein by reference. A jetting frequency of 160 MHz was used to generate drops of about 2 picoliters, up to 12 drops per pixel at 600 spi. The images formed exhibited excellent color quality with optical density values of 1.6 (Black), 1.6 (Cyan), 1.35 (Magenta), 0.9 (Yellow), and sharp edges, with lightfastness and waterfastness of about 99.5 percent.

EXAMPLE 5

A black semi-solid hot melt ink composition was prepared by mixing 46 percent by weight of the liquid vehicle decyl aldehyde, (Aldrich #D22,200-3) having an acoustic-loss value of 30 dB/mm and a boiling point of 208° C., 42 percent by weight of the solid additive 4-benzyloxy-3-methoxy benzaldehyde, (Aldrich #16,361-9), having a melting point of 65° C. and an acoustic-loss value of 40 dB/mm, 3 percent by weight of the UV absorber 2-(4-benzoyl-3-hydroxyphenoxy)ethylacrylate (Cyasorb UV-416, #41,321-6, Aldrich Chemical Company) melting point 78° C., 3 percent by weight of the antioxidant 3-hydroxy-2,2-dimethylpropyl-3-hydroxy-2,2-dimethyl propionate, (Aldrich #39,024-0), melting point 52° C., and 6 percent by weight of the colorant Orasol Black RLP (Ciba-Geigy). The resulting mixture was heated to a temperature of about 100° C. and stirred for a period of about 60 minutes until it formed a homogeneous solution, and subsequently it was cooled to 25° C. The resulting black ink had an acoustic loss value of 46 dB/mm and a viscosity of 5cps at 150° C.

EXAMPLE 6

A blue semi-solid hot melt ink composition was prepared by mixing 46 percent by weight of the liquid vehicle 2,3,5,6-tetrafluoro benzaldehyde, (Aldrich #32,893-6), with an acoustic-loss value of 25 dB/mm and a boiling point of 178° C., 42 percent by weight of the solid additive 3-benzyloxy-4-methoxy benzaldehyde, (Aldrich #16,395-3), with a melting point of 63° C. and an acoustic-loss value of 42 dB/mm, 3 percent by weight of the UV absorber 2-(4-benzoyl-3-hydroxyphenoxy)ethylacrylate (Cyasorb UV-416, #41,321-6, Aldrich) melting point 78° C., 3 percent by weight of the antioxidant dioctadecyl-3,3'-thiodipropionate, (Cyanox, STDP, #41,310-0, (Aldrich), melting point 66° C., and 6 percent by weight of the colorant Sudan Blue dye (BASF). The mixture was then heated to a temperature of about 100° C. and stirred for a period of about 60 minutes until it formed a homogeneous solution, and subsequently was cooled to 25° C. The resulting blue ink had an acoustic loss value of 42 dB/mm and a viscosity of 5.1 cps at 150° C.

EXAMPLE 7

A yellow semi-solid hot melt ink composition was prepared by mixing 46 percent by weight of the liquid vehicle decyl aldehyde, (Aldrich #D22,200-3) with an acoustic-loss value of about 30 dB/mm and a boiling point of 208° C., 42 percent by weight of the (2) solid paper surface leveling agent 4-benzyloxy-3-methoxy benzaldehyde, (Aldrich #16, 361-9), having a melting point of 65° C. and an acoustic-loss value of dB/mm, 3 percent by weight of the UV absorber 2-(4-benzoyl-3-hydroxyphenoxy) ethylacrylate (Cyasorb UV-416, #41,321-6, Aldrich Chemical Company) melting point 78° C., 3 percent by weight of the antioxidant 3-hydroxy-2,2-dimethylpropyl-3-hydroxy-2,2-dimethyl propionate , (Aldrich #39,024-0), melting point 52° C., and 6 percent by weight of the colorant Sudan yellow dye (BASF). The mixture resulting was heated to a temperature of about 100° C. and stirred for a period of about 60 minutes until it formed a homogeneous solution, and subsequently it was cooled to 25° C. The resulting yellow ink had an acoustic loss value of 47 dB/mm and a viscosity of 5.1 cps at 150° C.

EXAMPLE 8

A red semi-solid hot melt ink composition was prepared by mixing 46 percent by weight of the liquid vehicle 2,3,5,6-tetrafluoro benzaldehyde, (Aldrich #32,893-6), with an acoustic-loss value of 25 dB/mm and a boiling point of 178° C., 42 percent by weight of the additive 3-benzyloxy-4-methoxy benzaldehyde, (Aldrich #16,395-3), with a melting point of 63° C. and an acoustic-loss value of 42 dB/mm, 3 percent by weight of the UV absorber 2-(4-benzoyl-3-hydroxyphenoxy)ethylacrylate (Cyasorb UV-416, #41,321-6, Aldrich) melting point 78° C., 3 percent by weight of the antioxidant dioctadecyl 3,3'-thiodipropionate, (Cyanox, STDP, #41,310-0, Aldrich), melting point 66° C., and 6 percent by weight of the colorant Sudan Red dye (BASF). The resulting mixture was heated to a temperature of about 100° C. and stirred for a period of about 60 minutes until it formed a homogeneous solution, and it was cooled to 25° C. The resulting red ink had an acoustic loss value of 45 dB/mm and a viscosity of 5 cps at 150° C.

Each of the above four inks were incorporated into an acoustic ink jet printing test fixture utilizing the ejection mechanism disclosed in *J. Appl. Phys.* 65(9), May 1, 1989, and references therein, the disclosure of which are totally incorporated herein by reference. A jetting frequency of 160 MHz was used to generate drops of about 2 picoliters, up to 12 drops per pixel at 600 spi. The images formed exhibited excellent color quality with optical density values of 1.55 (Black), 1.65 (Cyan), 1.30 (Magenta), 0.9 (Yellow), and sharp edges, with lightfastness and waterfastness for the images of 98 percent for all the inks.

Other modifications of the present invention may occur to those of ordinary skill in the art subsequent to a review of the present application, and these modifications, including equivalents thereof, are intended to be included within the scope of the present invention.

What is claimed is:

1. A nonaqueous ink composition comprised of (1) a liquid aldehyde vehicle, a liquid acid vehicle, or mixtures thereof, with an acoustic-loss value of from about 5 to about 40 dB/mm, (2) a solid additive aldehyde, a solid additive acid, or mixtures thereof with a melting point of from about 35 to about 74° C. and an acoustic-loss value of from about 25 to about 80 dB/mm, (3) a lightfastness UV absorber, (4) a lightfastness antioxidant, and (5) a colorant, and which ink has an acoustic-loss value of from about 10 to about 80 dB/mm.

2. A nonaqueous ink composition in accordance with claim 1 wherein the liquid aldehyde or the liquid acid vehicle with an acoustic-loss value of from about 5 to about 40 dB/mm is present in an amount of from about 55 to about 1 percent by weight, the solid additive aldehyde or solid acid compound with a melting point of from about 35° C. to about 74° C. and an acoustic-loss value of from about 25 to about 80 dB/mm, is present in an amount of from about 5 to about 97 percent by weight, the UV absorber is present in an amount of from about 10 to about 0.5 percent by weight, the antioxidant is present in an amount of from about 10 to about 0.5 percent by weight, and the colorant is present in an amount of from about 20 to about 1 percent by weight and which ink possesses a viscosity of from about 1 centipoise to about 10 centipoise at a temperature of from about 125° C. to about 165° C.

3. A nonaqueous ink composition in accordance with claim 1 wherein the liquid acid vehicle is selected from the group consisting of (1) hexanoic acid, (2) 5-ketohexanoic acid, (3) octanoic acid, and (4) nonanoic acid.

4. A nonaqueous ink composition in accordance with claim 1 wherein the liquid aldehyde vehicle is selected from the group consisting of octyl aldehyde, decyl aldehyde, 2-ethoxybenzaldehyde, and 2,3,5,6-tetrafluorobenzaldehyde.

5. A nonaqueous ink composition in accordance with claim 1 wherein the solid additive(2) with a melting point of from about 35 to about 74° C. is selected from the group consisting of 2-hydroxyhexanoic acid, 6,8 dithiooctanoic acid, tiglic acid, 2-hydroxy-4-methoxy benzaldehyde, and 4-benzyloxy-3-methoxy benzaldehyde.

6. An ink in accordance with claim 1 wherein the lightfastness UV absorbing compound is 2-(4-benzoyl-3-hydroxyphenoxy)ethylacrylate.

7. An ink in accordance with claim 1 wherein the lightfastness antioxidant is selected from the group consisting of bis-(1,2,3,6-tetrahydrobenzaldehydepentaerythritol acetal, dioctadecyl 3,3'-thio dipropionate, and 3,3-hydroxy-2,2-dimethylpropyl-3-hydroxy-2,2-dimethylpropionate.

8. An ink in accordance with claim 1 further containing biocides, humectants, or mixtures thereof.

9. A printing process which comprises incorporating into an acoustic ink jet printer the ink of claim 1, and causing droplets of the ink to be ejected in image wise pattern onto a substrate.

10. A process which comprises (a) providing an acoustic ink printer having a pool of the liquid ink of claim 1 with a free surface and a printhead including at least one droplet ejector for radiating the free surface of said ink with focused acoustic radiation to eject individual droplets of ink therefrom on demand, said radiation being brought to focus with a finite waist diameter in a focal plane, and causing droplets of the ink to be ejected in image wise pattern onto a substrate.

11. An ink in accordance with claim 1 wherein the colorant is selected in an amount of from about 0.5 to about 20 percent by weight.

12. An ink in accordance with claim 1 wherein the colorant is a pigment.

13. An ink in accordance with claim 1 wherein the colorant is a pigment of carbon black.

14. An ink in accordance with claim 1 wherein the colorant is cyan, magenta, yellow, black, or mixtures thereof.

15. An ink in accordance with claim 1 wherein (1) the low acoustic-loss liquid acid vehicle is present in an amounts of from about 45 to about 50 percent by weight and is hexanoic acid, nonanoic acid, 5-ketohexanoic acid, or trans-2-methyl-2-pentenoic acid; (2) the low acoustic-loss solid additive acid is present in an amount of about from about 40 to about 45 percent by weight and is 2-hydroxyhexanoic acid, pentadecanoic acid, 6,8 dithio octanoic acid; or tiglic acid; (3) the lightfastness UV absorber is present in amounts of from about 1 to about 5 percent by weight and is 2-(4-benzoyl-3-hydroxyphenoxy)ethylacrylate, or bis[2-hydroxy-5-tert-octyl-3-(benzotriazol-2-yl) phenyl methane; and (4) the lightfastness antioxidant is present in amounts of from about 1 to about 3 percent by weight and is 3-hydroxy-2,2-dimethylpropyl-3-hydroxy-2,2-dimethyl propionate; or dioctadecyl-3,3'-thiodipropionate.

16. An ink in accordance with claim 1 wherein: (1) the liquid aldehyde vehicle is decylaldehyde, 2,3,5,6-tetrafluorobenzaldehyde, 2-methyl-3-ρ-tolylpropion aldehyde, or 5-methyl-2-phenyl-2-hexenal; (2) the solid additive aldehyde is 4-benzyloxy-3-methoxy benzaldehyd, 3-benzyloxy-4-methoxy benzaldehyde, or ethyl vanillin; (3) the lightfastness UV absorber is 2-(4-benzoyl-3-hydroxyphenoxy)ethylacrylate, or bis[2-hydroxy-5-tert-octyl-3-(benzotriazol-2-yl)phenylmethane; and (4) the lightfastness antioxidant is 3-hydroxy-2,2-dimethyl propyl-3-hydroxy-2,2-dimethyl propionate, or dioctadecyl-3,3'-thiodipropionate.

17. An ink in accordance with claim 1 with a viscosity of from about 1 centipoise to about 20 centipoise and an acoustic loss of from about 10 to about 100 dB/mm.

18. An ink in accordance with claim 1 wherein the liquid vehicle is an acid.

19. An ink in accordance with claim 1 wherein the liquid vehicle is an aldehyde.

20. A nonaqueous ink composition in accordance with claim 1 wherein the liquid aldehyde vehicle is an alkyl aldehyde, or an aryl aldehyde.

* * * * *